United States Patent [19]

Taniguchi

[11] Patent Number: 5,002,717
[45] Date of Patent: Mar. 26, 1991

[54] CONTROLLING METHOD OF INJECTION THROUGH INJECTION MOLDING MACHINE

[75] Inventor: Yoshiya Taniguchi, Kako, Japan

[73] Assignee: Toyo Machinery & Metal Co., Ltd., Hyogo, Japan

[21] Appl. No.: 503,785

[22] Filed: Apr. 3, 1990

[51] Int. Cl.$^5$ .............................................. B29C 45/52
[52] U.S. Cl. ............................ 264/328.1; 264/328.17; 425/208; 425/586; 425/587
[58] Field of Search ............ 264/328.1, 328.11, 328.17, 264/349; 425/207, 208, 209, 585, 586, 587

[56] References Cited

U.S. PATENT DOCUMENTS

| | | | |
|---|---|---|---|
| 4,767,306 | 8/1988 | Kawaguchi et al. | 425/586 |
| 4,879,077 | 11/1989 | Shimizu et al. | 425/587 |
| 4,966,539 | 10/1990 | Pena | 425/587 |

*Primary Examiner*—Jill L. Heitbrink
*Attorney, Agent, or Firm*—Wegner, Cantor, Mueller & Player

[57] ABSTRACT

A method controlling the injection of a molten resin through an in-line screw type injection molding machine. The molding machine is equipped with a check ring for permitting the injection of the molten resin by an advancement of the screw and also for preventing the molten resin from flowing backward. According to the method, the screw is rotated in the normal direction to knead and plasticize a resin material and further to feed the resultant molten resin to the free end portion of the screw. The screw then retracts to meter and store a predetermined quantity of the molten resin adjacent to the free end portion of the screw. The screw is next rotated in the reverse direction to pressure of the molten resin on the rear side of the check ring lower than that of the molten resin thus metered and stored on the front side of the check ring. The screw retracts to reduce the pressure of the resin on the front side of the check ring, thereby performing a decompression stroke. The screw finally advances to inject the molten resin into a mold.

3 Claims, 6 Drawing Sheets

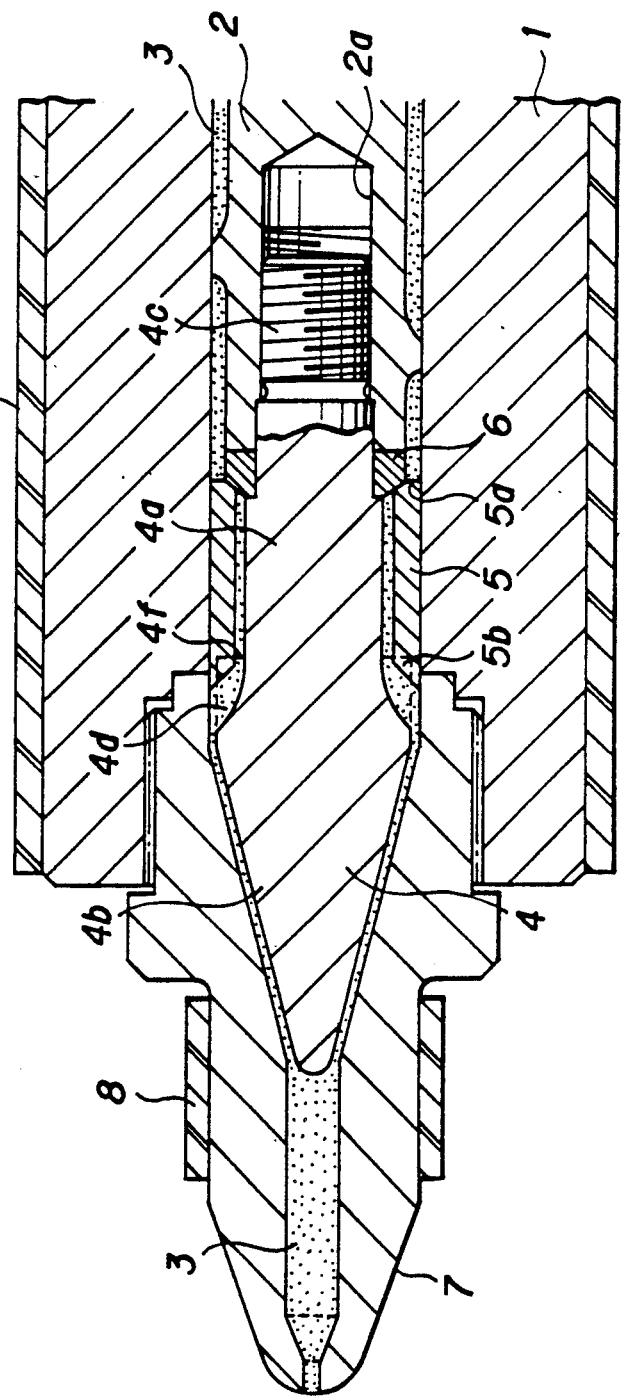

CONTROLLING METHOD OF INJECTION THROUGH INJECTION MOLDING MACHINE

BACKGROUND OF THE INVENTION

Field of the Invention

The present invention relates to a method for controlling the injection through an injection molding machine, and more specifically to a method for controlling the injection through an in-line screw type injection molding machine equipped with a check ring, i.e., a check valve for preventing molten resin from flowing backward from a side of a free end portion of a screw to a rear side of the screw during an injection stroke.

As has been known in the art and is illustrated in FIG. 8, an in-line screw type injection molding machine is designed to knead and plasticize a resin material, which has been fed from an unillustrated hopper, by the rotation of a screw 2 in a normal direction, namely, in the direction indicated by an arrow A within a heating cylinder 1 and then to store the resultant molten resin 3 on the side of a check head 4 mounted on the free end portion of the screw 2 under the feeding action of a thread groove of the screw 2. At this time, a check ring 5 functioning as a check valve toward the rear of the check head 4 moves to its front-most position due to the pressure of the resin fed by the screw 2, so that the check ring 5 is away from its check seat 6. The molten resin 3 is therefore fed forward through a spacing between the check ring 5 and the check seat 6, another spacing between an inner peripheral wall of the check ring 5 and a neck portion 4a of the check head 4, and grooves 4d in a head portion 4b of the check head 4. As the molten resin 3 is stored on the side of a free end portion of the check head 4, the screw 2 retracts in the direction indicated by an arrow C. When the screw 2 has retracted over a predetermined distance, in other words, when sufficient molten resin 3 for the injection shot has been stored (namely, at the metering completion point $P_1$ in FIG. 9), rotation of the screw 2 ceases, enabling completion of a mixing and kneading, plasticizing and metering stroke.

When an injection command is outputted after the above mixing and kneading, plasticizing and metering stroke, the screw 2 advances in the direction indicated by an arrow D (see FIG. 9) so that the molten resin 3 stored adjacent to the free end portion of the check head 4 is injected into the cavity of an unillustrated mold through a nozzle 7 fitted in a free end of the heating cylinder 1. At this time, the pressure build-up in the molten resin 3 stored adjacent to the free end portion of the check head 4 causes the check ring 5 to retract and an annular end face 5a of the check ring 5 is thus brought into close contact with check seat 6. As a result, the molten resin 3 stored adjacent to the free end portion of the check head 4 is prevented from flowing back to the rear side of the screw 2.

During the above mixing and kneading, plasticizing and metering stroke, the molten resin 3 stored adjacent to the free end of the check head 4 is prevented from dribbling out through the nozzle 7 by the resin which has been injected into the mold. When the mold is opened subsequent to the mixing and kneading, plasticizing and metering stroke, the molten resin 3 tends to undergo drooling through the nozzle 7 fitted in the free end of the heating cylinder 1 because the pressure of the molten resin 3 stored adjacent to the free end portion of the check head 4 is substantial. This drooling is known to cause problems such as silver blisters.

To avoid this problem, it has been conventional practice that, as shown in FIG. 10, the screw 2 is forced to retract further by about several millimeters from the aforementioned metering completion point $P_1$ to a point $P_2$ after the completion of the mixing and kneading, plasticizing and metering stroke but before the injection stroke, whereby the pressure of the molten resin 3 stored adjacent to the free end portion of the check head 4 is reduced. This procedure is called "decompression control" and is effective for the prevention of the above-described drooling.

However, the decompression control involves the problem that the molten resin 3 metered and stored adjacent to the front end portion of the check head 4 and the molten resin 3 fed to and stored on the rear side of the check head 4 are communicated to each other and are allowed to flow and the quantity of the former molten resin 3 already metered and stored is thus changed. This problem occurs in the following manner. Since the molten resin 3 has the same pressure on both the front and rear sides of the check ring 5 after the completion of the mixing and kneading, plasticizing and metering stroke, the above-mentioned retract of the screw 2 by the decompression control results in a lower pressure on molten resin 3 metered and stored adjacent to the free end portion of the check head 4 than that on the molten resin 3 fed to and stored on the rear side of the check ring 5. As a result, as depicted in FIG. 10, the check ring 5 is caused to separate from the check seat 6 and fails to function as a check valve. The quantity of the molten resin 3 stored adjacent to the free end portion of the check head 4 has therefore been changed. This has led to the problem that molded products vary fractionally from one shot to another due to minute variations in the corresponding metered quantities of the molten resin.

SUMMARY OF THE INVENTION

An object of the present invention is to provide a method for controlling the injection through an injection molding machine, which always assures constant-quantity injection of a resin without variations in metered resin quantities even when a decompression operation is performed, thereby permitting stable production of molded articles.

In one aspect of the present invention, there is thus provided a method for controlling the injection of molten resin through an in-line screw type injection molding machine equipped with a check ring for permitting the injection of the molten resin, which is stored on a side of a free end portion of a screw, by an advancement of the screw through a heating cylinder during each injection stroke and also for preventing the molten resin from flowing backward from the side of the free end portion of the screw to the rear side of the screw during the injection stroke, which comprises the following consecutive strokes:

rotating the screw in the normal direction to knead and plasticize a resin material and to feed the resultant molten resin to the free end portion of the screw and then retracting the screw to meter and store a predetermined amount of the molten resin adjacent to the free end portion of the screw;

reversing the screw to create a lower pressure in the molten resin on the rear side of check ring than that of the molten resin metered and stored on the front side of the check ring;

retracting the screw to reduce the pressure of the resin on the front side of the check ring, thereby performing a decompression stroke; and advancing the screw to inject the molten resin, which is stored on the front side of the check ring, into a mold.

According to the method of the present invention, the screw is reversed prior to the decompression stroke, whereby the pressure of the molten resin on the rear side of the check ring falls below that of the molten resin on the front side of the check ring; in other words, the molten resin already metered and stored. As a result, the check ring is forced rearward by the pressure of the molten resin metered and stored, so that the check ring prevents any flow of molten resin. Therefore, the quantity of the metered resin can always be precisely maintained. The method of the present invention has thus made it possible to stably produce molded articles of high quality. It has significant value to industry.

BRIEF DESCRIPTION OF THE DRAWINGS

The above and other objects, features and advantages of the present invention will become apparent from the following description and the appended claims, taken in conjunction with the drawings, in which:

FIG. 2 is a fragmentary cross-sectional view of the injection unit, showing a check head formed at the free end portion of a screw and its associated members;

DETAILED DESCRIPTION OF THE INVENTION AND PREFERRED EMBODIMENT

Figure 6:
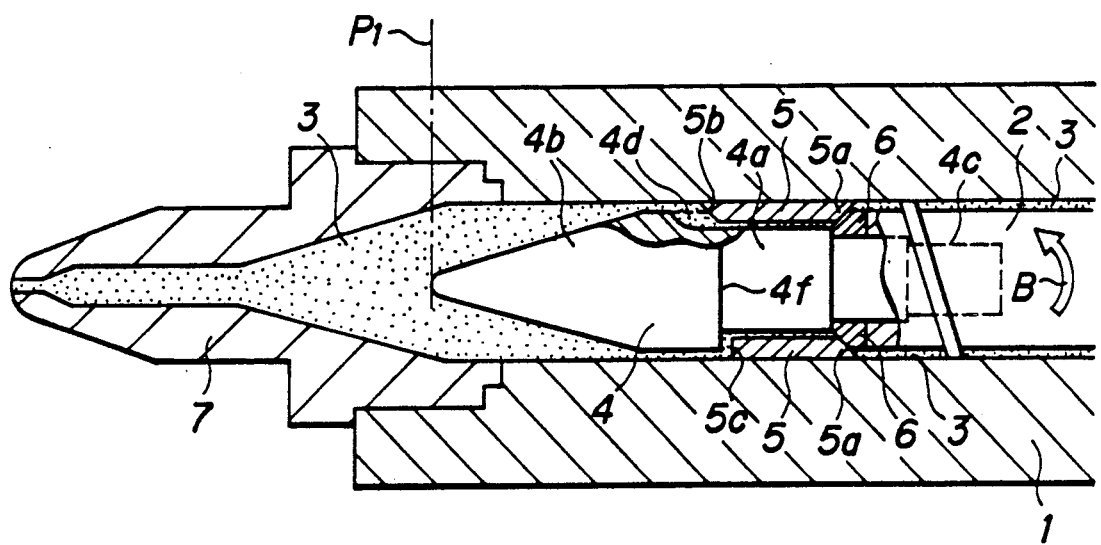
FIG. 6 illustrates the operation of the injection unit upon reverse rotation of the screw.
Figure 7:
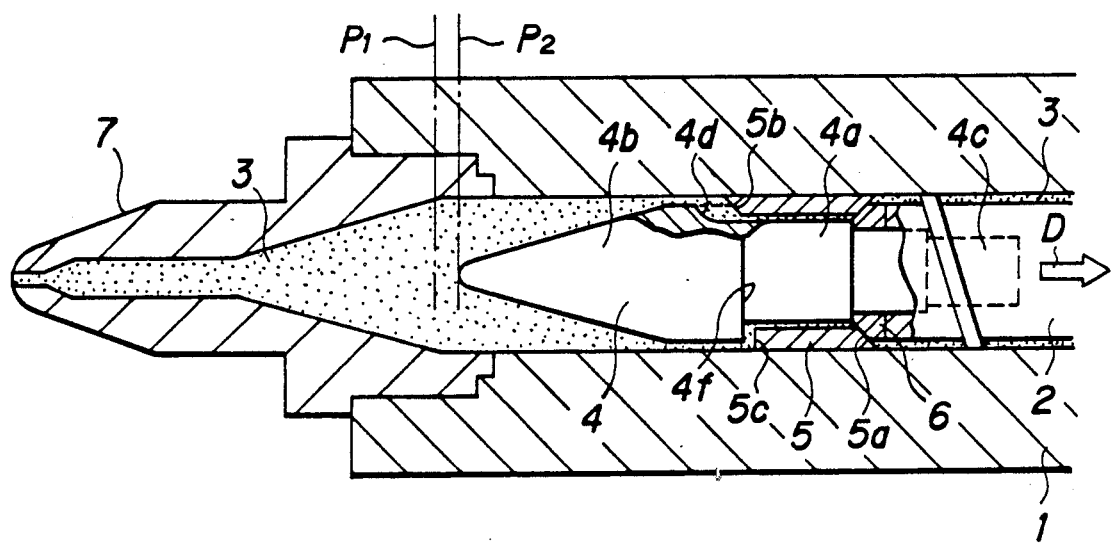
FIG. 7 depicts the operation of the injection unit in a decompression stroke.
Figure 8:
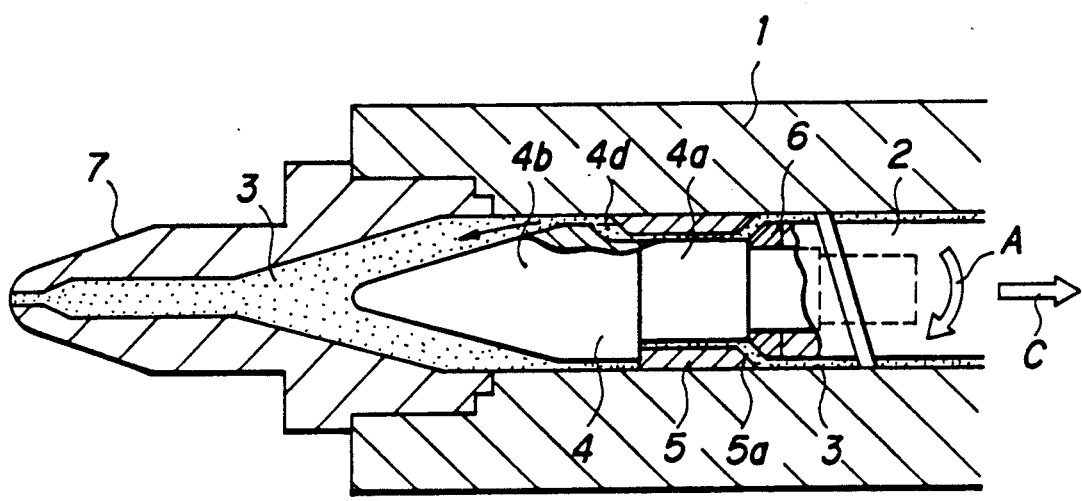
FIG. 8 shows the operation of the injection unit during the charging stroke of an injection molding machine controlled by a conventional method.
Figure 9:
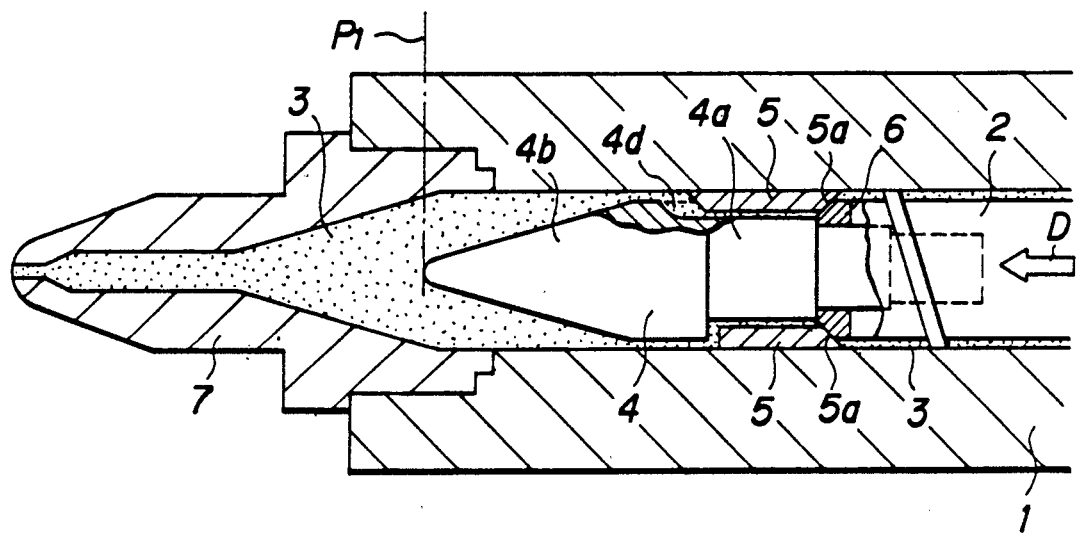
FIG. 9 illustrates the operation of the injection unit of FIG. 8 during the injection stroke.
Figure 10:
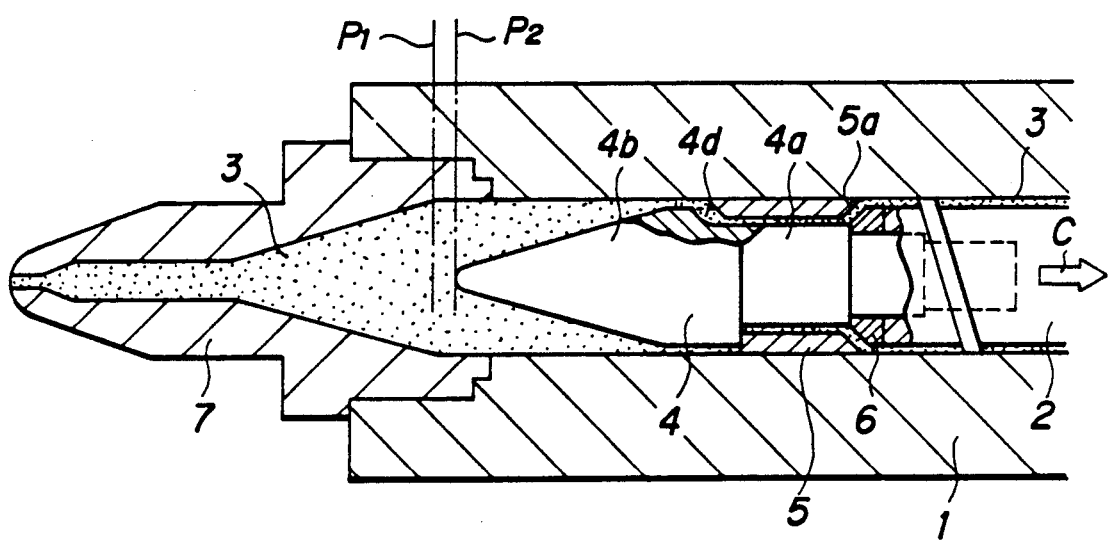
FIG. 10 depicts the operation of the injection unit of FIG. 8 during a decompression operation.

The present invention will hereinafter be described on the basis of the sole embodiment shown in FIG. 1 through FIG. 7, in which similar members, portions and directions to the corresponding members, portions and directions in the injection unit of the injection molding machine depicted in FIG. 8 through FIG. 10, said injection molding machine being controlled by the conventional method, are designated by like numerals or symbols.

Figure 1:
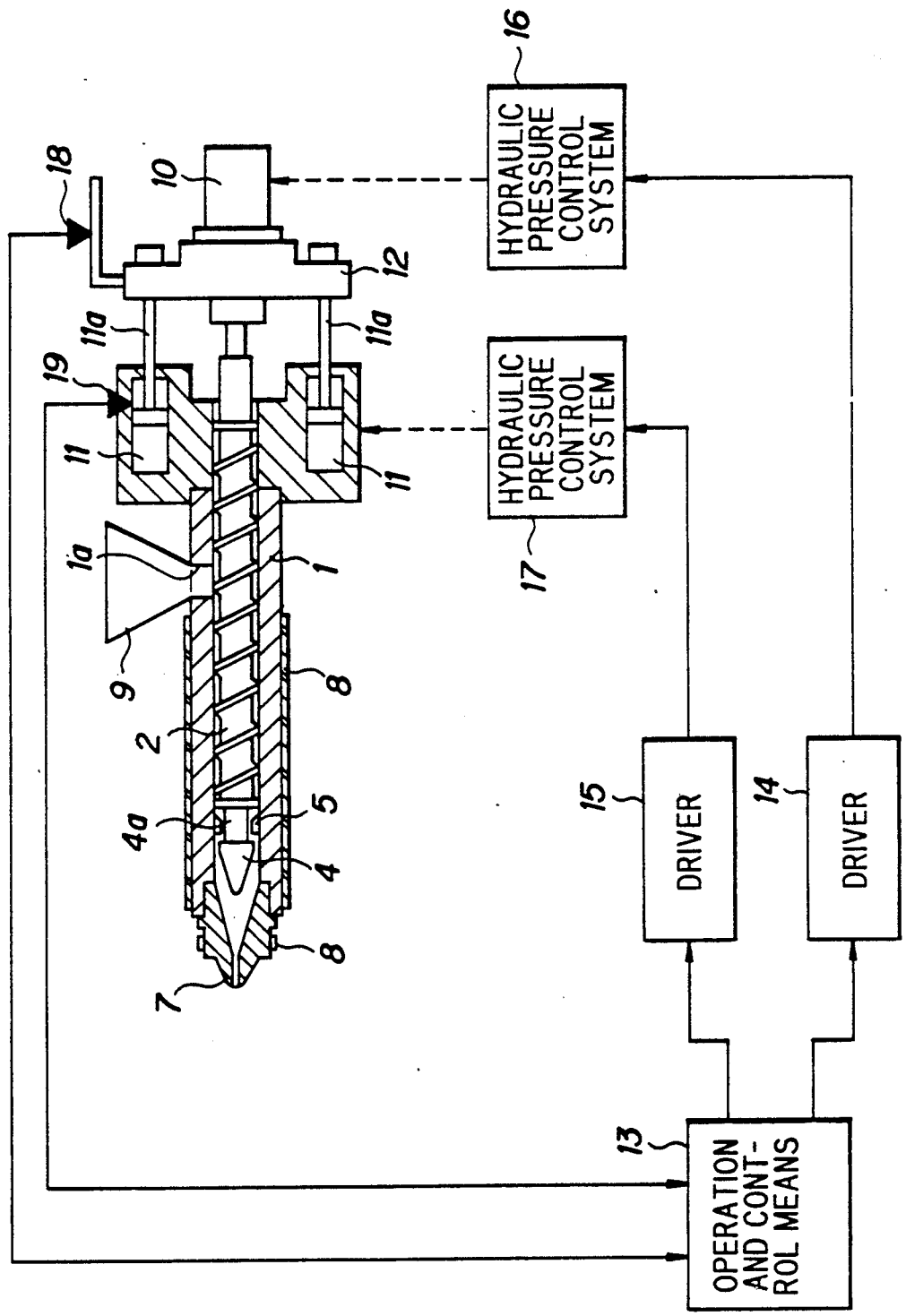
FIG. 1 is a schematic illustration of the construction of an injection unit of an injection molding machine, which injection molding machine is controlled by the method of the present invention.

FIG. 1 schematically illustrates the construction of the injection unit of the injection molding machine which is controlled by the method of the present invention. In the figure, numeral 1 indicates a heating cylinder which is supported at a base portion thereof by an unillustrated support member. A nozzle 7 is screwed in and secured to a free end portion of the heating cylinder 1. A band heater 8 is wrapped on the outer peripheral wall of the heating cylinder 1. Designated at numeral 2 is a screw, which is arranged within the heating cylinder 1 in such a way that the screw 2 is operatively and selectively rotated in normal and reverse directions and also moved back and forth. A check head 4 is screwed in and fixed to the free end portion of the screw 2. Numeral 5 indicates a check ring as a check valve, located at a position corresponding to the neck portion 4a of the check head 5. Designated at numeral 9 is a hopper, which feeds a resin material to the screw 2 through an opening 1a.

There is shown a rotary drive unit 10 for rotating the screw 2 in normal and reverse directions. The screw 2 is connected at a rear end thereof to a drive shaft of the rotary drive unit 10 by a suitable means. The rotary drive unit 10 is constructed of a hydraulic motor in the illustrated embodiment, but an electric motor or the like can substitute for the hydraulic motor. Designated at numeral 11 are axial drive units for advancing the screw 2 and also for applying a compensating force for the back pressure created during the plasticizing stroke by the screw 2. Hydraulic cylinders are used as the axial drive units 11 in the illustrated embodiment. However, in some instances, they may be replaced by a hydraulic motor or an electric motor by additionally providing a suitable mechanism which is adapted to convert a rotary force to a linear force.

In the illustrated embodiment, there are two axial drive units 11 for the screw 2. They are driven under control by a common hydraulic control system which is controlled by an operation and control means to be described herein. Piston rods 11a as acting portions of the axial drive units 11 are connected to a support 12 of the hydraulic motor as the rotary drive unit 10. As a consequence, the screw 2 moves back and forth together with the rotary drive source 10.

Designated at numeral 13 is the operation and control means which serves to control the entirety of the injection molding machine; it consists of a microcomputer. Upon receipt of input from an injection stroke sensor 18 and an injection pressure sensor 19, the operation and control means 13 recognizes, based on the information, the advance stroke (injection stroke), injection speed and injection pressure of the screw 2. Based on an injection control program and the above-mentioned input, the operation and control means 13 also drives under control the rotary drive unit 10 by way of a driver 14 and a hydraulic pressure control system 16 and the axial drive unit 11 by way of another driver 15 and another hydraulic pressure control system 17 as will be described herein.

FIG. 2 is an enlarged fragmentary view showing the check head 4 and its associated members. As illustrated in the figure, an externally threaded portion 4c of the check head 4 is screwed in and fastened to an internally threaded portion 2a at the free end portion of the screw 2 with an annular check seat 6 being interposed therebetween, whereby the check head 4 is connected to the screw 2. The check ring 5 having an outer diameter equal to the inner diameter of the heating cylinder 1 is arranged at a position corresponding to the neck portion 4a of the check head 4 in such a way that the check ring 5 is axially slidable to a predetermined extent. In the illustrated embodiment, the check ring 5 and check head 4 (namely, screw 2) are designed to rotate together.

Figure 3A:
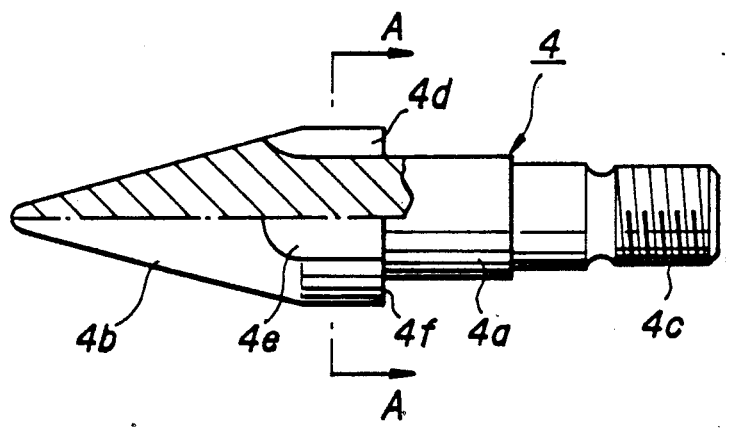
FIG. 3(a) is a partly cut-away front view of the check head.
Figure 3B:
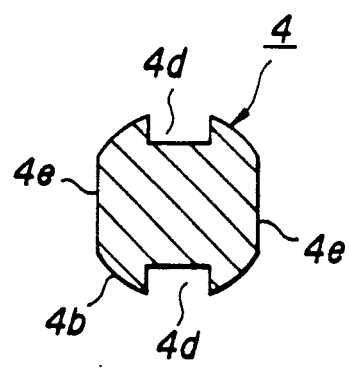
FIG. 3(b) is a cross-sectional view of the check head, taken in the direction of arrows A—A of FIG. 3(a)

FIGS. 3(a) and 3(b) illustrate details of the check head 4. Namely, FIG. 3(a) is a partly cut-away front view of the check head 4, while FIG. 3(b) is a cross-sectional view of the check head 4, taken in the direction of arrows A,A. As is envisaged from these figures, the check head 4 is formed, as an integral member, of the neck portion 4a, a head portion 4b and the externally threaded portion 4c. The neck portion 4a is located centrally of the check head 4 and has an outer diameter smaller than the inner diameter of the check ring 5, whereas the head portion 4b and externally threaded portion 4c are located on both sides of the neck portion 4a. The head portion 4b is substantially conical in shape. In the illustrated embodiment, the head portion 4b defines at a basal portion thereof a pair of grooves 4d which are in engagement with corresponding lugs of the check ring 5. The lugs will be described subsequently herein. In the figures designated at symbol 4e is a pair of flat faces formed to facilitate the holding of the check head 4 by a tool upon attachment and detachment of the check head 4. Symbol 4f indicates a stepped portion.

Figure 4A:
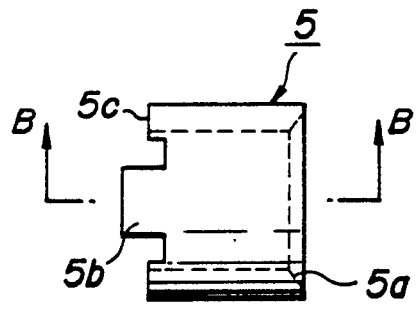
FIG. 4(a) is a front view of a check ring in the injection unit.
Figure 4B:
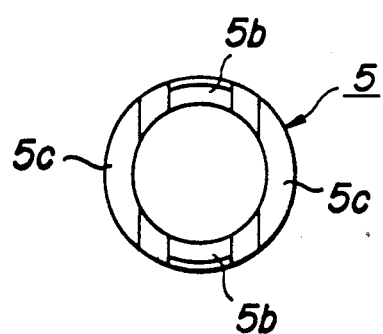
FIG. 4(b) is a left side view of the check ring of FIG. 4(a)
Figure 4C:
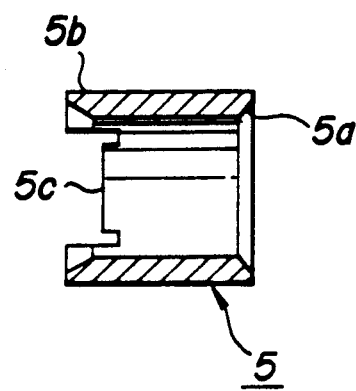
FIG. 4(c) is a cross-sectional view of the check ring, taken in the direction of arrows B—B of FIG. 4(a)

FIG. 4(a) through FIG. 4(c) show details of the check ring 5. Namely, FIG. 4(b) is a front view of the check ring 5, FIG. 4(a) a left side view of the check ring 5, and FIG. 4(c) a cross-sectional view of the check ring 5, taken in the direction of arrows B,B. As is illustrated in these figures, the check ring 5 is formed at one end thereof into an annular end face 5a having a tapered surface complementary to a tapered surface of the check seat 6. Formed on the opposite end of the check ring 5 are a pair of lugs 5b and a pair of arcuate flat end faces 5c. In an assembled state, the lugs 5b of the check ring 5 are in engagement with the corresponding grooves 4d of the check head 4 so that the check head 4 and check ring 5 rotate together when the screw 2 rotates.

During a mixing and kneading, plasticizing and metering stroke in which the screw 2 is rotated in a normal direction to store a resin material adjacent to the head portion 4b of the check head 4 at the free end of the screw 2 while mixing and kneading and plasticizing the resin material, the check ring 5 assumes a position slid leftward from the position shown in FIG. 2 relative to the check head 4. Accordingly, the annular end face 5a is separated from the check seat 6 and the arcuate flat end faces 5c are in abutment with the stepped portion 4f. Here, clearances of a predetermined width are defined between free end portions of the lugs 5b of the check ring 5 and bottom walls of the corresponding grooves 4d of the check head 4, respectively. The molten resin 3 on the side of the screw 2 is therefore fed to the side of the free end portion of the check head 4 through a clearance between the annular end face 5a of the check ring 5 and the check seat 6, a clearance between the inner peripheral wall of the check ring 5 and the neck portion 4a of the check head 4 and the clearances between the lugs 5b of the check ring and the bottom walls of the corresponding grooves 4d of the head portion 4b of the check head 4. In an injection stroke in which the screw 2 is advanced to feed the molten resin 3, which has been stored adjacent to the free end portion of the check head 4, into the cavity of a mold (not illustrated), the check ring 5 assumes the position slid rightward relative to the check head 4 due to a reaction force from the molten resin 3 stored adjacent to the free end portion of the check head 4, namely, the position shown in FIG. 2. In other words, the annular end face 5a of the check head 5 is in close contact with the check seat 6, whereby the molten resin 3 stored adjacent to the free end portion of the check head 4 is prevented from flowing back toward the side of the screw 2.

A method for controlling the injection through the injection molding machine of the above-described construction will next be described with reference to FIG. 5 through FIG. 7, in which the same check ring 5 is used although the check ring 5 is shown to have a cross-sectional shape different to that depicted in FIGS. 2 and 4 to illustrate one of the lugs 5b and one of the arcuate flat end faces 5c together.

At the point that an injection stroke for one shot has been completed, the screw 2 is at its fully advanced position. In this state, based on commands from the operation and control means 13, the rotary drive unit 10 is driven and rotated in a normal direction via the driver 14 and hydraulic pressure control system 16, so that the screw 2 is driven and rotated at a predetermined revolution speed in the direction indicated by arrow A in FIG. 5, namely, in a normal direction. By this rotation of the screw 2 in a normal direction, the resin material supplied from the hopper 9 is, as is known well in the art, fed forward successively through a feed zone, compression zone and metering zone of the screw 2 by the feeding action of the thread of the screw 2 while being mixed and kneaded and plasticized. At this time, the check ring 5 is shifted to the position shown in FIG. 5 by the pressure of the molten resin on a side forward of the metering zone of the screw 2, whereby the storage of the molten resin 3 begins adjacent to the free end portion of the check head 4.

Figure 5:
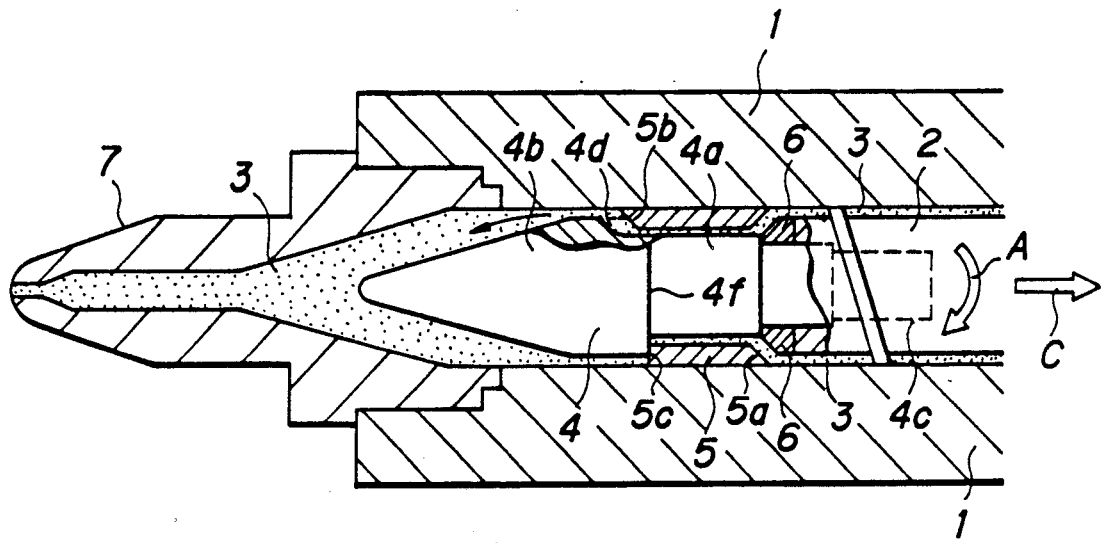
FIG. 5 shows the operation of the injection unit in a charging stroke.

As the molten resin 3 is being stored in an increasing quantity adjacent to the check head 4 by the subsequent rotation of the screw 2 in a normal direction, the screw 2 is retracted in the direction indicated by arrow C in FIG. 5 while being rotated. Here, the operation and control means 13 controls the axial drive unit 11 by way of the driver 15 and the hydraulic pressure control system 17 so that the screw 2 is retracted while maintaining constant the reaction force (back pressure) from the molten resin 3. When the quantity of the molten resin stored adjacent to the free end portion of the check head 4 has eventually reached the quantity required for one shot, in other words, when the screw 2 has retracted to the metering completion point $P_1$ shown in FIG. 6, the operation and control means 13 recognizes it on the basis of measured information from the injection stroke sensor 18 and stops the rotation of the screw 2.

The mixing and kneading, plasticizing and metering stroke for one shot is completed as described above. During the mixing and kneading, plasticizing and metering stroke, the free end of the nozzle 7 is closed by the resin solidifying in the closed mold, free of illustration. The above-mentioned drooling therefore does not occur. After completion of the mixing and kneading, plasticizing and metering stroke, the operation and control means 13 rotates the screw 2 for a predetermined time in reverse direction, i.e., in the direction indicated by arrow B in FIG. 6 by way of the rotary drive unit 10 before the mold is opened. By the reverse rotation of the screw 2, the molten resin 3 located rear of the check ring 5 (i.e., the molten resin located in the metering zone of the screw 2) is fed backward, whereby the resin pressure is reduced. The pressure of the molten resin 3 located rear of the check ring 5 therefore becomes lower than the molten resin 3 metered and stored adjacent to the free end portion of the check head 4. As a result, a pressure difference occurs between the molten resin located forward of the check ring 5 and that located rear of the check ring 5. The check ring 5 is hence slid rightward as seen in FIG. 6 relative to the check head 4, so that the annular end face 5a is brought into close contact with the check seat 6 to achieve the state of FIG. 6 that the molten resin 6 stored adjacent to the free end portion of the check head 4 is prevented from flowing backward.

Then, the operation and control means 13 causes the screw 2 to retract from the metering completion point $P_1$ to the point $P_2$ in the direction indicated by arrow D by means of the axial drive unit 11, whereby the pressure of the molten resin 3 stored adjacent to the free end portion of the check head 4 is reduced by a predetermined value. During this so-called decompression stroke, the check ring 5 is in close contact with the check seat 6 as described above. The molten resins 3 located on both sides of the check ring 5 are hence not communicated to each other and not allowed to flow. The quantity of the molten resin metered and stored adjacent to the free end portion of the check head 4 is therefore maintained constant.

When the decompression stroke has been completed and the molding operation proceeds to the time point for taking out the molded product of the preceding shot from the mold, the operation and control means 13 instructs an unillustrated mold opening/closure drive means to open the mold. As a result, the free end of the nozzle 7 is released from the state closed by the resin solidified in the mold. Drooling of the molten resin 3 through the free end of the nozzle 7 however does not occur because the pressure of the molten resin 3 stored adjacent to the free end portion of the check head 4 has already been reduced through the decompression stroke described above.

When the mold has been closed subsequent to the above-described opening and the molding operation reaches the injection timing of the next cycle, the operation and control means 13 causes the screw to advance to inject the molten resin 3, which has been stored adjacent to the free end portion of the check head 4, into the mold.

A continuous injection molding operation can be performed by repeating the above operation. The injection control method of the above embodiment makes it possible to stably and continuously mold products of high quality because the quantity of the molten resin metered and stored adjacent to the free end portion of the check head 4 does not vary, unlike conventional methods even when decompression is effected.

The present invention has been described on the basis of the embodiment illustrated in the accompanying drawings. It should however be borne in mind that various modifications can be contemplated without departing from the spirit of the present invention, for example, with respect to the shapes of the check head and check ring.

What is claimed is:

1. A method for controlling the injection of a molten resin through an in-line screw type injection molding machine equipped with a check ring for permitting the injection of the molten resin, which is stored on a front side of a free end portion of a screw, by an advancement of the screw through a heating cylinder in an injection stroke and also for preventing the molten resin from flowing backward from the front side of the free end portion of the screw to the rear side of the screw during the injection stroke, which comprises the following consecutive strokes:

rotating the screw in a normal direction to knead and plasticize a resin material and to feed the resultant molten resin to the free end portion of the screw and then retracting the screw to meter and store a predetermined amount of the molten resin adjacent to the free end portion of the screw;

rotating the screw in reverse direction to make the pressure of the molten resin on the rear side of the check ring lower than the pressure of said predetermined amount of the molten resin on the front side of the check ring;

retracting the screw to reduce the pressure of the resin on the front side of the check ring, thereby performing a decompression stroke; and advancing the screw to inject the molten resin, which is stored on the front side of the check ring, into a mold.

2. The method of claim 1, wherein a check head is screwed on the free end portion of the screw with a check seat interposed therebetween, the check head defines a neck portion having an outer diameter smaller than the inner diameter of the check ring, and the check ring is axially slidable under resin pressure to a predetermined extent over the neck portion while being maintained at an outer periphery thereof in close contact with an inner wall of the heating cylinder.

3. The method of claim 1, wherein the screw is driven selectively in normal or reverse direction by an electromagnetic motor or hydraulic motor.

* * * * *